United States Patent
Lin et al.

(10) Patent No.: US 9,829,715 B2
(45) Date of Patent: Nov. 28, 2017

(54) EYEWEAR DEVICE FOR TRANSMITTING SIGNAL AND COMMUNICATION METHOD THEREOF

(75) Inventors: Chih-Jung Lin, New Taipei (TW); Yueh-Lin Liao, Taipei (TW)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/355,743

(22) Filed: Jan. 23, 2012

(65) Prior Publication Data

US 2013/0188252 A1    Jul. 25, 2013

(51) Int. Cl.
G02B 27/14    (2006.01)
G09G 5/00     (2006.01)
G02B 27/22    (2006.01)
H04N 13/04    (2006.01)

(52) U.S. Cl.
CPC ..... G02B 27/2264 (2013.01); H04N 13/0438 (2013.01); H04N 13/0497 (2013.01); H04N 2213/008 (2013.01)

(58) Field of Classification Search
CPC ........... G02B 27/2264; H04N 13/0438; H04N 13/0497; H04N 2213/008
USPC ................... 359/630–632; 345/7–9
See application file for complete search history.

(56) References Cited

U.S. PATENT DOCUMENTS

| | | |
|---|---|---|
| 4,864,629 A | 9/1989 | Deering |
| 5,430,464 A | 7/1995 | Lumelsky |
| 5,483,254 A | 1/1996 | Powell |
| 5,500,939 A | 3/1996 | Kurihara |
| 5,577,981 A | 11/1996 | Jarvik |
| 5,778,174 A | 7/1998 | Cain |
| 5,841,447 A | 11/1998 | Drews |
| 5,886,701 A | 3/1999 | Chauvin et al. |
| 5,913,727 A | 6/1999 | Ahdoot |
| 5,949,428 A | 9/1999 | Toelle et al. |
| 6,016,474 A | 1/2000 | Kim et al. |
| 6,057,855 A | 5/2000 | Barkans |
| 6,061,179 A | 5/2000 | Inoguchi et al. |

(Continued)

FOREIGN PATENT DOCUMENTS

| | | |
|---|---|---|
| CN | 1653374 | 8/2005 |
| CN | 101184166 | 5/2008 |

(Continued)

OTHER PUBLICATIONS

Duca, et al., A Relational Debugging Engine for Graphics Pipeline, International Conference on Computer Graphics and Ineractive Techniques, ACM SIGGRAPH 2005, pp. 453-463, ISSN: 0730-0301.

(Continued)

Primary Examiner — Alicia M Harrington

(57) ABSTRACT

The invention provides an eyewear device for transmitting a signal and a communication method thereof. The eyewear device comprises a receiving unit, a shutter and a transmitting unit. For example, the receiving unit is capable of receiving a synchronization signal, and the shutter performs an operation in response to the synchronization signal. Meanwhile, the transmitting unit transmits the synchronization signal to another eyewear device. By this way, each eyewear device is capable of receiving the synchronization signal, and re-transmits the synchronization signal to another eyewear device.

9 Claims, 4 Drawing Sheets

(56) References Cited

U.S. PATENT DOCUMENTS

| | | | |
|---|---|---|---|
| 6,064,354 A | 5/2000 | DeLuca | |
| 6,141,740 A | 10/2000 | Mahalingaiah et al. | |
| 6,188,442 B1 | 2/2001 | Narayanaswami | |
| 6,215,593 B1 | 4/2001 | Bruce | |
| 6,243,054 B1 | 6/2001 | DeLuca | |
| 6,278,418 B1 | 8/2001 | Doi | |
| 6,281,903 B1 | 8/2001 | Martin et al. | |
| 6,308,565 B1 | 10/2001 | French et al. | |
| 6,314,493 B1 | 11/2001 | Luick | |
| 6,438,664 B1 | 8/2002 | McGrath et al. | |
| 6,476,807 B1 | 11/2002 | Duluk, Jr. et al. | |
| 6,492,991 B1 | 12/2002 | Morein et al. | |
| 6,496,193 B1 | 12/2002 | Surti et al. | |
| 6,525,725 B1 | 2/2003 | Deering | |
| 6,545,683 B1 | 4/2003 | Williams | |
| 6,559,813 B1 | 5/2003 | DeLuca et al. | |
| 6,611,253 B1 | 8/2003 | Cohen | |
| 6,690,381 B1 | 2/2004 | Hussain et al. | |
| 6,750,870 B2 | 6/2004 | Olarig | |
| 6,825,847 B1 | 11/2004 | Molnar et al. | |
| 6,839,062 B2 | 1/2005 | Aronson et al. | |
| 6,891,543 B2 | 5/2005 | Wyatt | |
| 6,951,515 B2 | 10/2005 | Ohshima et al. | |
| 7,015,909 B1 | 3/2006 | Morgan, III et al. | |
| 7,072,477 B1 | 7/2006 | Kincaid | |
| 7,170,515 B1 | 1/2007 | Zhu | |
| 7,203,356 B2 | 4/2007 | Gokturk et al. | |
| 7,218,291 B2 | 5/2007 | Abdalla et al. | |
| 7,308,115 B2 | 12/2007 | Zhang et al. | |
| 7,324,594 B2 | 1/2008 | Lamboray et al. | |
| 7,370,016 B1 | 5/2008 | Hunter et al. | |
| 7,463,270 B2 | 12/2008 | Vale et al. | |
| 7,486,290 B1 | 2/2009 | Kilgariff et al. | |
| 7,616,202 B1 | 11/2009 | Chen et al. | |
| 7,692,659 B1 | 4/2010 | Molnar et al. | |
| 7,719,563 B2 | 5/2010 | Richards | |
| 7,839,803 B1 | 11/2010 | Snelgrove et al. | |
| 7,856,147 B2 | 12/2010 | Srinidhi | |
| 7,925,067 B2 | 4/2011 | Bacus et al. | |
| 8,019,449 B2 | 9/2011 | Barzegar et al. | |
| 8,024,768 B2 | 9/2011 | Berger et al. | |
| 8,203,502 B1* | 6/2012 | Chi et al. | 345/7 |
| 8,279,168 B2 | 10/2012 | Glomski et al. | |
| 8,363,969 B1 | 1/2013 | Wang et al. | |
| 8,375,301 B2 | 2/2013 | Nuyttens et al. | |
| 8,411,966 B2 | 4/2013 | Zhang et al. | |
| 8,610,707 B2 | 12/2013 | Chen | |
| 8,800,051 B2 | 8/2014 | Ahuja et al. | |
| 9,494,797 B2 | 11/2016 | Luebke et al. | |
| 2001/0010508 A1 | 8/2001 | Kakeya | |
| 2001/0043751 A1 | 11/2001 | Takahashi et al. | |
| 2002/0024675 A1 | 2/2002 | Foxlin | |
| 2002/0089467 A1 | 7/2002 | Hara | |
| 2002/0109701 A1 | 8/2002 | Deering | |
| 2002/0114078 A1 | 8/2002 | Halle et al. | |
| 2002/0178218 A1 | 11/2002 | Butlin | |
| 2003/0001857 A1 | 1/2003 | Doyle | |
| 2003/0025849 A1 | 2/2003 | Hara | |
| 2003/0032484 A1 | 2/2003 | Ohshima et al. | |
| 2003/0046587 A1 | 3/2003 | Bheemarasetti et al. | |
| 2003/0122820 A1 | 7/2003 | Doyle | |
| 2003/0160798 A1 | 8/2003 | Buehler | |
| 2003/0184468 A1 | 10/2003 | Chen et al. | |
| 2004/0021664 A1 | 2/2004 | Takemoto et al. | |
| 2004/0041822 A1 | 3/2004 | Izuka et al. | |
| 2004/0102247 A1 | 5/2004 | Smoot et al. | |
| 2004/0130552 A1 | 7/2004 | Duluk, Jr. et al. | |
| 2004/0205281 A1 | 10/2004 | Lin et al. | |
| 2004/0208394 A1 | 10/2004 | Kurata | |
| 2005/0009583 A1 | 1/2005 | Cheung et al. | |
| 2005/0062738 A1 | 3/2005 | Handley et al. | |
| 2005/0093873 A1 | 5/2005 | Paltashev et al. | |
| 2005/0140682 A1 | 6/2005 | Sumanaweera et al. | |
| 2005/0198487 A1 | 9/2005 | Zimmer et al. | |
| 2006/0086022 A1 | 4/2006 | Would et al. | |
| 2006/0170616 A1 | 8/2006 | Hirayama | |
| 2006/0170703 A1 | 8/2006 | Liao | |
| 2006/0284792 A1 | 12/2006 | Foxlin | |
| 2007/0002274 A1 | 1/2007 | Somani et al. | |
| 2007/0018973 A1 | 1/2007 | Shih et al. | |
| 2007/0094673 A1 | 4/2007 | Hunt et al. | |
| 2007/0124474 A1 | 5/2007 | Margulis | |
| 2007/0136579 A1 | 6/2007 | Levy et al. | |
| 2007/0188444 A1 | 8/2007 | Vale et al. | |
| 2007/0239409 A1 | 10/2007 | Alan | |
| 2007/0257906 A1 | 11/2007 | Shimura et al. | |
| 2008/0049964 A1 | 2/2008 | Porwal et al. | |
| 2008/0143895 A1 | 6/2008 | Peterka et al. | |
| 2008/0204361 A1* | 8/2008 | Scales et al. | 345/8 |
| 2008/0239499 A1 | 10/2008 | Fukuda | |
| 2008/0252596 A1 | 10/2008 | Bell et al. | |
| 2008/0273755 A1 | 11/2008 | Hildreth | |
| 2008/0293464 A1 | 11/2008 | Cheng et al. | |
| 2008/0293488 A1 | 11/2008 | Cheng et al. | |
| 2008/0294674 A1 | 11/2008 | Reztlaff, II | |
| 2008/0312010 A1 | 12/2008 | Marty et al. | |
| 2009/0077504 A1 | 3/2009 | Bell et al. | |
| 2009/0083370 A1 | 3/2009 | Franklin et al. | |
| 2009/0099824 A1 | 4/2009 | Falash et al. | |
| 2009/0244682 A1 | 10/2009 | Saishu et al. | |
| 2010/0007582 A1 | 1/2010 | Zalewski | |
| 2010/0073363 A1 | 3/2010 | Densham et al. | |
| 2010/0074489 A1 | 3/2010 | Bacus et al. | |
| 2010/0149372 A1 | 6/2010 | Silverstein | |
| 2010/0177931 A1 | 7/2010 | Whytock et al. | |
| 2010/0194863 A1 | 8/2010 | Lopes et al. | |
| 2010/0196859 A1* | 8/2010 | Saugen et al. | 434/11 |
| 2010/0226628 A1 | 9/2010 | Yamaji et al. | |
| 2010/0296747 A1 | 11/2010 | Srinidhi | |
| 2011/0128351 A1 | 6/2011 | Newton et al. | |
| 2011/0157334 A1 | 6/2011 | Kim et al. | |
| 2011/0157667 A1 | 6/2011 | Lacoste et al. | |
| 2011/0159885 A1 | 6/2011 | Song et al. | |
| 2011/0164047 A1 | 7/2011 | Pance | |
| 2011/0165841 A1 | 7/2011 | Baek et al. | |
| 2011/0181622 A1 | 7/2011 | Bacus et al. | |
| 2011/0199466 A1* | 8/2011 | Kim | H04N 13/0438 348/55 |
| 2011/0205389 A1 | 8/2011 | Zhang et al. | |
| 2011/0249076 A1 | 10/2011 | Zhou et al. | |
| 2011/0254756 A1* | 10/2011 | Lee et al. | 345/9 |
| 2012/0014456 A1 | 1/2012 | Martinez Bauza et al. | |
| 2012/0021806 A1* | 1/2012 | Maltz | 345/8 |
| 2012/0026157 A1 | 2/2012 | Unkel et al. | |
| 2012/0076197 A1 | 3/2012 | Byford et al. | |
| 2012/0092514 A1 | 4/2012 | Vandame | |
| 2012/0117145 A1 | 5/2012 | Clift et al. | |
| 2012/0139906 A1 | 6/2012 | Zhang et al. | |
| 2012/0162379 A1 | 6/2012 | Dahi et al. | |
| 2012/0176296 A1* | 7/2012 | Border et al. | 345/8 |
| 2012/0183215 A1 | 7/2012 | Van Hook et al. | |
| 2012/0194418 A1* | 8/2012 | Osterhout et al. | 345/156 |
| 2012/0198219 A1 | 8/2012 | Preimesberger et al. | |
| 2012/0206323 A1 | 8/2012 | Osterhout et al. | |
| 2012/0257065 A1 | 10/2012 | Velarde et al. | |
| 2012/0262592 A1 | 10/2012 | Rabii | |
| 2012/0320232 A1 | 12/2012 | Trumbo | |
| 2013/0007888 A1 | 1/2013 | Ahuja et al. | |
| 2013/0009943 A1 | 1/2013 | Li et al. | |
| 2013/0021226 A1* | 1/2013 | Bell | 345/8 |
| 2013/0027521 A1 | 1/2013 | DeLuca | |
| 2013/0027606 A1 | 1/2013 | Voss et al. | |
| 2013/0106647 A1 | 5/2013 | Wheeler | |
| 2013/0106674 A1 | 5/2013 | Wheeler et al. | |
| 2013/0176386 A1 | 7/2013 | Midavaine | |
| 2013/0202191 A1 | 8/2013 | Wang | |
| 2013/0242402 A1 | 9/2013 | Konig | |
| 2013/0285885 A1 | 10/2013 | Nowatzyk et al. | |
| 2014/0085437 A1 | 3/2014 | Unkel et al. | |

(56) References Cited

U.S. PATENT DOCUMENTS

| | | |
|---|---|---|
| 2014/0168034 A1 | 6/2014 | Luebke et al. |
| 2014/0168783 A1 | 6/2014 | Luebke et al. |
| 2015/0213640 A1 | 7/2015 | Neill et al. |

FOREIGN PATENT DOCUMENTS

| | | |
|---|---|---|
| CN | 101420618 | 4/2009 |
| CN | 101945287 | 1/2011 |
| CN | 102006473 | 4/2011 |
| CN | 102055982 | 5/2011 |
| CN | 102445755 | 5/2012 |
| DE | 69216391 | 4/1997 |
| DE | 102006049404 | 4/2008 |
| DE | 102008020858 | 11/2009 |
| DE | 102008039987 | 3/2010 |
| DE | 102008042397 | 4/2010 |
| TW | 201219829 | 5/2012 |
| TW | 201228380 | 7/2012 |
| WO | 2011156721 | 12/2011 |
| WO | 2012034963 | 3/2012 |
| WO | 2012062681 | 5/2012 |

OTHER PUBLICATIONS gDebugger, graphic Remedy, http://www.gremedy.com, Aug. 8, 2006.

Parhami, Computer Arithmetic, Oxford University Press, Jun. 2000, pp. 413-418.

M. Alonso Jr. et al., "Pre-Compensation for High-Order Aberrationsof the Human Eye Using On-Screen Image Deconvolution", IEE, pp. 556-559, 2003.

Wan, Ming, et al., "Interactive Stereoscopic Rendering of Volumetric Environments." Visualization and Computer Graphics, IEEE Transactions on 10.1 (2004): 15-28.

* cited by examiner

EYEWEAR DEVICE FOR TRANSMITTING SIGNAL AND COMMUNICATION METHOD THEREOF

BACKGROUND OF THE INVENTION

Field of the Invention

The present invention relates to eyewear devices and communication methods thereof, and more particularly, to an eyewear device for receiving and transmitting a signal and a communication method thereof.

Description of the Prior Art

Due to the prevalence of 3D image processing technology and 3D displaying devices, consumers nowadays have an ever-increasing chance of watching 3D images. In general, a 3D image playing system presently in wide use comprises a liquid crystal display (LCD) and an eyewear device. There are two types of eyewear devices, namely "passive eyewear devices" and "active eyewear devices".

The operating principle of the "passive eyewear device" requires: coating the liquid crystal display (LCD) with a "micro retarder" (or known as a micro polarizer), wherein the "micro retarder" shifts odd and even horizontal lines (that is, R, L horizontal lines) on a display screen by specific angles (such as 45° and 135°) in a top-to-bottom direction, respectively; and displaying a 3D image in a "row-interlaced format" on the liquid crystal display (LCD). Hence, a user wearing the "passive eyewear device" (that is, polarizer eyeglasses) watches the 3D image presented in a perspective manner, as the user's left and right eyes can see different images, respectively.

The operating principle of the "active eyewear device" requires: displaying alternately images provided to a user's left and right eyes on the liquid crystal display (LCD) by means of time sharing; controlling a left-eye shutter and a right-eye shutter of the "active eyewear device" to "shut" and "open" by a synchronization signal; shutting the right eye shutter when the display shows the left eye's image; and shutting the left-eye shutter when the display shows the right eye's image. Hence, the left eye's image and the right eye's image are alternately displayed at a speed higher than that of human beings' persistence of vision, such that perspective vision occurs to the brain. For details of "active eyewear devices", please make reference to products of NVIDIA Corporation, such as 3D Vision™ Wireless Glasses Kit or 3D Vision™ Pro, and visit the Website http://www.nvidia.com/object/3d-vision-main.html However, the conventional "active eyewear device" requires receiving a synchronization signal whereby the left-eye shutter and the right-eye shutter are controlled to "shut" and "open". The prior art teaches installing a signal transmitting device in the vicinity of the liquid crystal display (LCD), in the vicinity of the screen in a cinema, or somewhere close to the "active eyewear device", such that the signal transmitting device transmits the synchronization signal. Nonetheless, in the situation where the venue of display is extremely spacious, the "active eyewear device" positioned far away from the signal transmitting device may be ineffective in receiving the synchronization signal or may fail to receive the synchronization signal.

Accordingly, it is imperative to put forth a novel eyewear device and a communication method thereof for overcoming distance-related limitations and receiving a signal efficiently:

SUMMARY OF THE INVENTION

The present invention in an aspect puts forth an eyewear device capable of overcoming distance-related limitations, and more particularly, an "active 3D eyewear device" capable of overcoming distance-related limitations.

The present invention in another aspect puts forth an eyewear device for transmitting a signal and a communication method thereof, and more particularly, an "active 3D eyewear device" capable of transmitting a signal.

The present invention in an embodiment puts forth an eyewear device (such as an "active 3D eyewear device") for transmitting a signal, comprising:

a receiving unit for receiving an external signal;

a shutter electrically connected to the receiving unit for performing an operation in response to the external signal; and a transmitting unit electrically connected to the receiving unit for transmitting the external signal to another eyewear device.

The present invention in an embodiment puts forth a communication method for transmitting a signal with an eyewear device, the eyewear device having a receiving unit, a shutter, and a transmitting unit, the communication method comprising the steps of:

(a) receiving an external signal by the receiving unit;

(b) performing an operation by the shutter in response to the external signal; and (c) transmitting the external signal to another eyewear device by the transmitting unit.

In an embodiment of the present invention, a communication method for transmitting a signal between a plurality of eyewear devices is provided, wherein the eyewear devices each comprise a receiving unit, a shutter, and a transmitting unit, the communication method comprising the steps of:

receiving an external signal by the receiving unit of the first eyewear device;

performing an operation by the shutter of the first eyewear device in response to the external signal;

transmitting the external signal to the second eyewear device by the transmitting unit of the first eyewear device;

receiving the external signal by the receiving unit of the second eyewear device;

performing an operation by the shutter of the second eyewear device in response to the external signal; and transmitting the external signal to the third eyewear device by the transmitting unit of the second eyewear device.

Although this specification describes the present invention in terms of features, advantages, and their similar expressions, it does not mean that all the features and advantages to be implemented by the present invention are supposed to be described in any single specific embodiment of the present invention. By contrast, it is understandable that expression of related features and advantages is premised on the fact that a combination of specific features, advantages, or characteristics described in detailed embodiments is disclosed in at least one specific embodiment of the present invention. Hence, the description of features, advantages, and their similar expressions in this specification is related to an identical specific embodiment, but not necessarily so.

One can further understand the features and advantages of the present invention by making reference to the description below and the appended claims or making reference to the embodiments described hereunder with regard to the present invention.

BRIEF DESCRIPTION OF THE DRAWINGS

To understand the advantages of the present invention instantly, one can make reference to specific detailed embodiments illustrated with the accompanying drawings and intended to go into details on the present invention which has hitherto been described in the above summary of the invention. One should understand that the drawings only depict typical detailed embodiments of the present invention and thus does not deem the detailed embodiments of the present invention as restrictive of the scope of the present invention, and should understand that extra clarity and details of the present invention are illustrated with the accompanying drawings as follows.

DETAILED DESCRIPTION OF THE EMBODIMENTS

Figure 1:
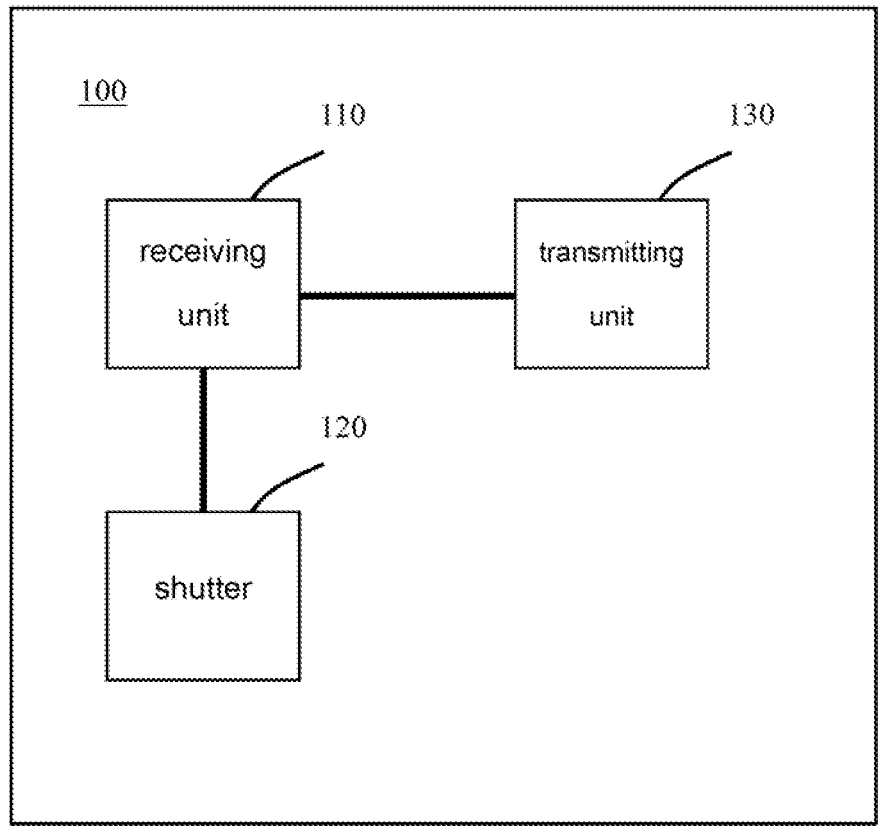
FIG. 1 is a schematic view of a framework of an eyewear device according to an embodiment of the present invention.

Referring to FIG. 1 through FIG. 4, there are shown a flow chart and block diagrams of the frameworks, functions, and operation of a device, a method, and a computer program product which can be implemented according to various embodiments of the present invention. Hence, every block shown in the flow chart or block diagram denotes a module, section, or a portion of a program code, comprising one or more executable command for implementing specified logical functions. Furthermore, a point to note is that, in other embodiments, it is feasible that functions described by the blocks are performed in a sequence other than one shown in the drawings. For example, two blocks shown to be connected can actually be executed simultaneously as well. Alternatively, in some situations, blocks shown in a diagram can be executed in a sequence opposite to one shown in the diagram, depending on the functions involved. Furthermore, a point to note is that each block in a block diagram and/or a flow chart, and a combination of blocks in a block diagram and/or a flow chart can be implemented by a system of hardware serving a special purpose, or its/their specific functions or operation can be executed through a combination of hardware serving a special purpose and a computer command.

FIG. 1 shows a framework of an eyewear device 100 according to an embodiment of the present invention. For the basic structure of the eyewear device 100, please make reference to products of NVIDIA Corporation: 3D Vision™ Wireless Glasses Kit or 3D Vision™ Pro, and thus it is not described herein for the sake of brevity. In particular, the eyewear device 100 in the embodiment of the present invention is different from its predecessors disclosed in the prior art in that the eyewear device 100 comprises a receiving unit 110, a shutter 120, and a transmitting unit 130. The receiving unit 110 is electrically connected to the shutter 120 and the transmitting unit 130. Preferably, the receiving unit 110 receives a RF signal, and the transmitting unit 130 transmits the RF signal, but the present invention is not limited thereto.

The receiving unit 110 receives an external signal from an external device (not shown). The external device is a signal transmitting device or another eyewear device (identical to or different from the eyewear device 100). The external signal is a synchronization signal. For details of data contained in a synchronization signal, please make reference to external signals received by the products of NVIDIA Corporation, such as 3D Vision™ Wireless Glasses Kit or 3D Vision™ Pro.

A point to note is that the external signal described herein is not limited to a synchronization signal, as the external signal can also comprise a multimedia signal, and the multimedia signal can comprise a caption data, an audio data, a video data, or a combination thereof, especially in the situation where the external signal is transmitted by means of RF, using sufficient communication bandwidth.

The shutter 120 performs an operation in response to the external signal. In this embodiment, the external signal is a synchronization signal, and the shutter 120 opens or shuts in response to the synchronization signal. In the situation where a user is watching a video on a screen with the eyewear device 100, the shutter 120 hides the user's right eye as soon as the screen displays the left eye's image, and conversely the shutter 120 hides the user's left eye as soon as the screen displays the right eye's image. Hence, the left eye's image and the right eye's image are alternately displayed at a speed higher than that of human beings' persistence of vision, such that perspective vision occurs to the brain. For details of how the shutter 120 opens or shuts in response to the synchronization signal, please make reference to shutters of the products of NVIDIA Corporation, such as 3D Vision™ Wireless Glasses Kit.

The transmitting unit 130 transmits the external signal to another eyewear device. The transmitting unit 130 transmits the external signal to the eyewear device according to a Zigbee protocol, a Bluetooth protocol, or an ANT protocol, but the present invention is not limited to the aforesaid protocols. By making reference to the above description, persons skilled in the art understand that, after receiving an external signal, the eyewear device 100 of the present invention re-transmits the external signal to another eyewear device. Accordingly, each of the eyewear devices is capable of receiving a signal and re-transmitting the signal. Therefore, the eyewear device 100 of the present invention overcomes a drawback of the prior art, that is, a conventional eyewear device positioned far away from a signal transmitting device is ineffective in receiving a synchronization signal or fails to receive the synchronization signal. It should be noted that the receiving unit 110 and the transmitting unit 130 could be formed as a transceiver, though the present invention is not limited thereto.

Figure 2:
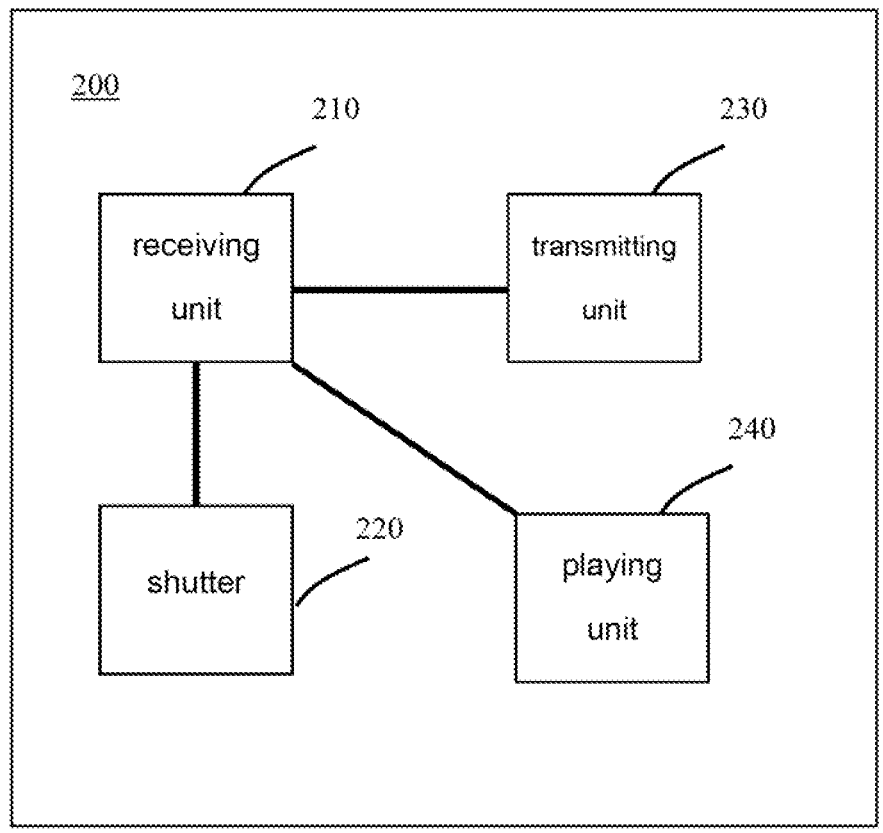
FIG. 2 is a schematic view of a framework of an eyewear device according to another embodiment of the present invention.

FIG. 2 shows a framework of an eyewear device 200 according to another embodiment of the present invention. In addition to a receiving unit 210, a shutter 220, and a transmitting unit 230, the eyewear device 200 further comprises a playing unit 240. The playing unit 240 is a speaker, a liquid crystal display (LCD), or any other multimedia playing device.

The connection and functions of the receiving unit 210, the shutter 220, and the transmitting unit 230 in FIG. 2 are similar to those of the receiving unit 110, the shutter 120, and the transmitting unit 130 in FIG. 1 and thus are not described again. The eyewear device 200 differs from the eyewear device 100 in that an external signal received by the receiving unit 210 comprises a synchronization signal and a multimedia signal. The playing unit 240 is electrically connected to the receiving unit 210 for playing the multimedia signal. For example, with the playing unit 240 being a speaker, and the multimedia signal being an audio data, the speaker receives and plays the audio data. Alternatively, with the playing unit 240 being a liquid crystal display, and the multimedia signal being a video data, the liquid crystal display receives and displays the video data.

Figure 3:
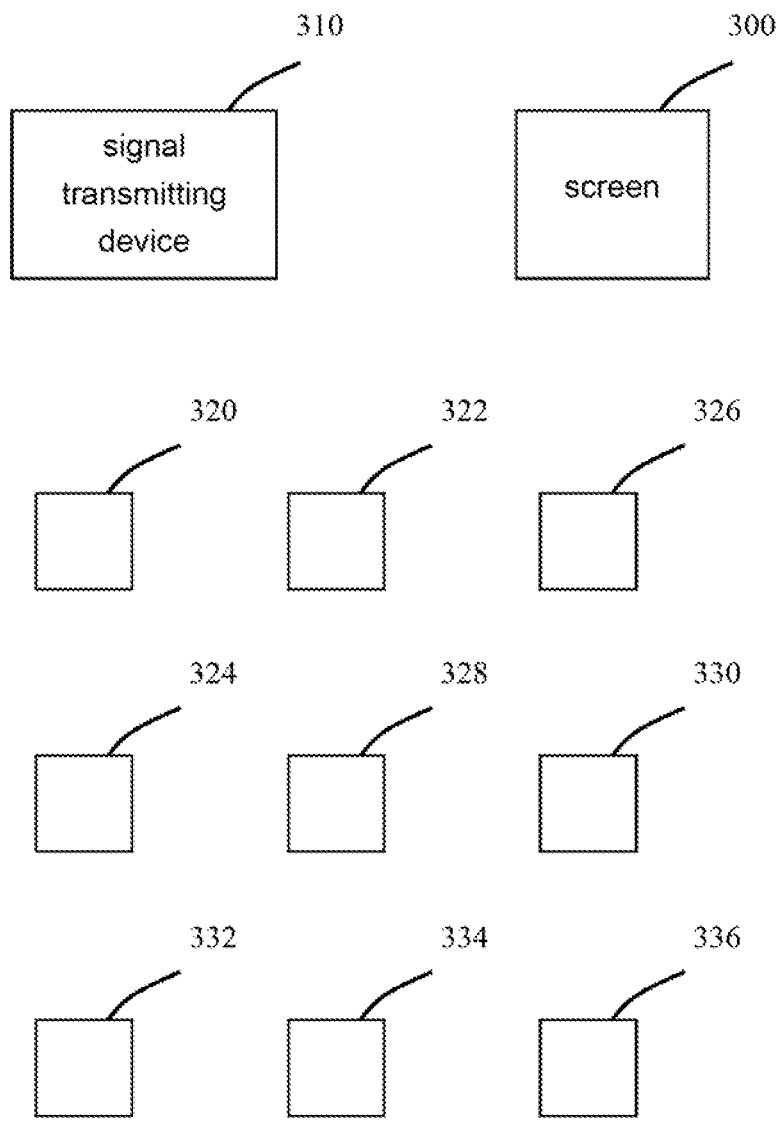
FIG. 3 is a schematic view of a communication method for use with the eyewear device according to an embodiment of the present invention.

FIG. 3 is a schematic view of a communication method for use with the eyewear device according to an embodiment of the present invention. As shown in the drawing, the eyewear device comprises a screen 300, a signal transmitting device 310, eyewear devices 320, 322, 324, 326, 328, 330, 332, 334, 336, wherein the specified quantity of the eyewear devices herein is illustrative rather than restrictive of the present invention.

The screen 300 displays a video data. The video data is a 3D video data. Hence, the eyewear devices 320-336 have to open or shut the shutters alternately to allow the user's left eye and right eye to watch a left eye's image and a right eye's image alternately, such that perspective vision occurs to the user's brain.

The signal transmitting device 310 transmits an external signal. The external signal is a synchronization signal and/or a multimedia signal. The synchronization signal controls the shutter in the eyewear devices 320-336 to open or shut. The multimedia signal is played by the playing unit on the eyewear devices 320-336.

After the eyewear device 320 closest to the signal transmitting device 310 has received an external signal (such as a synchronization signal), the eyewear device 320 not only opens or shuts the shutter according to the synchronization signal, but also re-transmits the synchronization signal to the eyewear devices 322, 324. Likewise, after receiving a synchronization signal and opening or shutting the shutter according to the synchronization signal, the eyewear devices 322, 324 re-transmit the synchronization signal. For example, the eyewear device 322 transmits the synchronization signal to the eyewear devices 326, 328, whereas the eyewear device 324 transmits the synchronization signal to the eyewear device 332. Likewise, after receiving the synchronization signal, the eyewear device 328 re-transmits the synchronization signal to the eyewear device 334, and then the eyewear device 326 re-transmits the synchronization signal to the eyewear device 330. The aforesaid sequence of transmitting the synchronization signal is illustrative rather than restrictive of the present invention.

Figure 4:
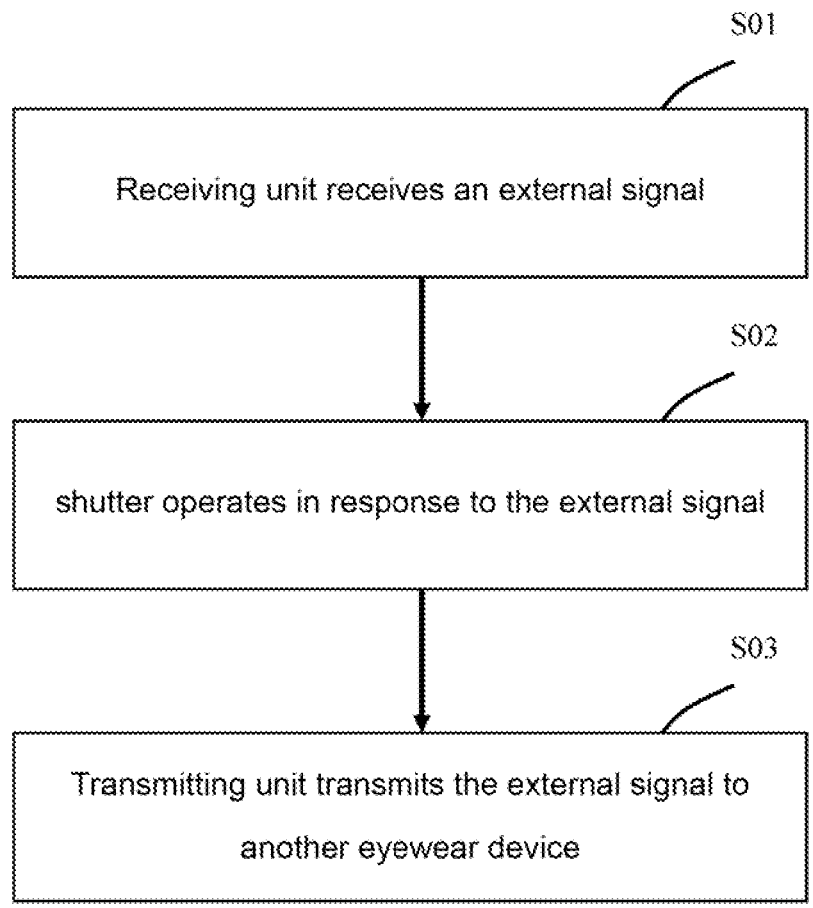
FIG. 4 is a flow chart of a communication method for transmitting a signal between eyewear devices according to an embodiment of the present invention.

Accordingly, take a Bluetooth protocol as an example, the eyewear devices 320-336 form "Piconet" or "Scatternet" under the Bluetooth protocol. In short, a Bluetooth device can be a member of more than one Piconet, whereas a master role on a specific Piconet can also be a slave role in other Piconets. Two Piconets have the slave role in common, and the slave role serves as a middleman whereby masters in the two Piconets can communicate with each other. Two or more independent Piconets can collectively form a Scatternet Bluetooth wireless network; and, in doing so, the extent of wireless communication increases to thereby cope with problems likely to occur to the conventional "active eyewear device" located at an overly spacious venue as disclosed in the prior art. For more details of "Piconet" or "Scatternet", please visit the Website http://www.bluetooth.com FIG. 4 is a flow chart of a communication method for transmitting a signal between eyewear devices according to an embodiment of the present invention. In this embodiment, the eyewear device comprises at least a receiving unit, a shutter, and a transmitting unit. First, the receiving unit of the eyewear device receives an external signal (step S01), wherein the external signal is a synchronization signal and/or a multimedia signal. The external signal is transmitted to the receiving unit according to a Zigbee protocol, a Bluetooth protocol, or an ANT protocol, but the present invention is not limited to the aforesaid protocols.

Afterward, the shutter in the eyewear device operates in response to the external signal (step S02). For example, the external signal is the synchronization signal, and the shutter opens or shuts in response to the synchronization signal. The left eye's image and the right eye's image are alternately displayed at a speed higher than that of human beings' persistence of vision, such that perspective vision occurs to the user's brain. In another embodiment of the present invention, the external signal further comprises a multimedia signal, and the eyewear device is equipped with a playing unit therein for playing the multimedia signal.

Finally, the transmitting unit in the eyewear device transmits the external signal to another eyewear device (step S03). Likewise, the transmitting unit transmits the external signal to another eyewear device according to a Zigbee protocol, a Bluetooth protocol, or an ANT protocol. According to the aforesaid description of the communication method, persons skilled in the art understand that the eyewear device of the present invention is capable of receiving a signal and re-transmitting the signal and thus overcomes a drawback of the prior art, that is, a conventional eyewear device positioned far away from a signal transmitting device is ineffective in receiving a synchronization signal or fails to receive the synchronization signal.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The present invention is disclosed above by preferred embodiments. However, persons skilled in the art should understand that the preferred embodiments are illustrative of the present invention only, but should not be interpreted as restrictive of the scope of the present invention. Hence, all equivalent changes or modifications made to the aforesaid embodiments should fall within the scope of the present invention, provided that they do not depart from the spirit embodied in the present invention. Accordingly, the legal protection for the present invention should be defined by the appended claims.

What is claimed is:
1. An apparatus comprising:
 a receiving unit of a first active 3D eyewear device for receiving a synchronization signal from an external device, wherein the synchronization signal controls left eye and right eye view operations of active 3D eyewear devices;
 the first active 3D eyewear device for alternatively performing a left eye view operation and a right eye view operation in response to the synchronization signal; and a transmitting unit of the first active 3D eyewear device electrically connected to the receiving unit of the first active eyewear device for transmitting the synchronization signal received by the receiving unit of the first active 3D eyewear device to a second active 3D eyewear device, wherein the second active 3D eyewear device cannot receive the synchronization signal from the external device.

2. The apparatus of claim 1, wherein the synchronization signal comprises a multimedia signal.

3. The apparatus of claim 2, further comprising:
a playing unit electrically connected to the receiving unit for playing the multimedia signal.

4. The apparatus of claim 3, wherein the multimedia signal comprises a caption data, an audio data, or a video data.

5. The apparatus of claim 3, wherein the playing unit is a speaker.

6. The apparatus of claim 3, wherein the playing unit is a liquid crystal display.

7. The apparatus of claim 1, wherein the transmitting unit transmits the synchronization signal to another eyewear device according to a Zigbee protocol, a Bluetooth protocol, or an ANT protocol.

8. A communication method for transmitting a signal with an active 3D eyewear device, the active 3D eyewear device having a receiving unit, a shutter, and a transmitting unit, the communication method comprising the steps of:
(a) receiving an external signal including a synchronization signal by the receiving unit, wherein the synchronization signal controls open and close operation of the shutter;
(b) performing alternating open and close operation on right and left eye views by the shutter in response to the synchronization signal: and
(c) transmitting the external signal received by the receiving unit to another eyewear device by the transmitting unit.

9. A communication method for transmitting a signal between a plurality of active 3D eyewear devices, the eyewear devices each having a receiving unit, a shutter, and a transmitting unit, the communication method comprising the steps of;
receiving an external signal including a synchronization signal by the receiving unit of the first active 3D eyewear device, wherein the synchronization signal controls open and close operations;
performing open and close operations on a right and left eye views by the shutter of the first eyewear device in response to the synchronization signal received by the receiving unit of the first eyewear device;
transmitting the external signal received by the receiving unit of the first eyewear device to the second eyewear device by the transmitting unit of the first eyewear device;
receiving the external signal by the receiving unit of the second eyewear device from the first eyewear device;
performing an operation by the shutter of the second eyewear device in response to the synchronization signal received by the receiving unit of the second eyewear device from the transmitting unit of the first eyewear device; and
transmitting the external signal received by the receiving unit of the second eyewear device to the third eyewear device by the transmitting unit of the second eyewear device.

* * * * *